United States Patent [19]

Badertscher

[11] Patent Number: 5,891,494
[45] Date of Patent: Apr. 6, 1999

[54] PREPARATION OF POTATO CRISPS AND CHIPS

[75] Inventor: Ernest Badertscher, Orbe, Switzerland

[73] Assignee: Nestec S.A., Vevey, Switzerland

[21] Appl. No.: 720,356

[22] Filed: Sep. 27, 1996

[30] Foreign Application Priority Data

Sep. 28, 1995 [EP] European Pat. Off. .............. 95810607

[51] Int. Cl.[6] ....................................... A23B 7/00
[52] U.S. Cl. ............................... 426/52; 426/49; 426/102; 426/510; 426/511; 426/523; 426/637
[58] Field of Search ................................ 426/52, 637, 49, 426/18, 28, 102, 302, 305, 549, 602, 615, 509, 510, 511, 520, 523

[56] References Cited

U.S. PATENT DOCUMENTS

| | | |
|---|---|---|
| 3,244,538 | 4/1966 | Knehler . |
| 3,397,993 | 8/1968 | Strong . |
| 3,649,305 | 3/1972 | Wilder . |
| 3,830,941 | 8/1974 | Luft et al. . |
| 4,058,631 | 11/1977 | Roan . |
| 5,059,435 | 10/1991 | Sloan et al. . |
| 5,141,759 | 8/1992 | Sloan et al. ............................ 426/102 |
| 5,242,699 | 9/1993 | Bednar et al. . |
| 5,441,758 | 8/1995 | Lewis et al. . |

FOREIGN PATENT DOCUMENTS

| | | |
|---|---|---|
| 0026565A1 | 4/1981 | European Pat. Off. . |
| 0060942A1 | 9/1982 | European Pat. Off. . |

*Primary Examiner*—Leslie Wong
*Attorney, Agent, or Firm*—Vogt & O'Donnell, LLP

[57] ABSTRACT

A potato product is obtained by washing peeled potatoes, cutting the potatoes into slices then treating the slices with superheated steam and coating the steam-treated slices with an emulsion prepared from an edible oil and a starchy material, and the coated potato product may be toasted or cooled and frozen.

17 Claims, No Drawings

PREPARATION OF POTATO CRISPS AND CHIPS

The present invention relates to a method of preparing reduced-fat crisps and chips, as well as to the reduced-fat crisps and chips obtained by this method.

Chips are traditionally prepared by cutting pre-peeled potatoes into slices and then immersing them in frying oil, so as to brown them. Chips which are tender on the inside and crisp on the outside are thus obtained, but their fat content is relatively high.

For the preparation of oven-ready chips, it has been known for a long time to carry out a coating step before a pre-frying step, so as to reduce the amount of oil soaked up by the potato slices during this second step. The chips thus obtained nevertheless have a fat content which is still relatively high, of the order of 10 to 16 %, for example.

U.S. Pat. No. 5,059,435 describes in particular a method of preparing chips in which potatoes are peeled and cut into chip-pieces, they are preheated to 49–60° C. for 20–60 min, blanched in water at 71–87.8° C. for 5–7 min or in steam at 99–102° C. for 1–3 min, immersed in a solution containing, in particular, salt and sodium hydrogen pyrophosphate, they are air-dried at 93–110° C., coated with a mixture containing, in particular, modified potato starch, modified corn starch, rice flour, whey and water, they are prefried in oil at 186° C. for 30–90 s and are then cooled, packaged and frozen at −18° C. Chips with a fat content of about 13 % are thus obtained. To finish cooking them, the consumer can cook them directly in the oven or immerse them in frying oil.

SUMMARY OF THE INVENTION

The object of the present invention is to provide an economical, quick and simple method of preparing reduced-fat crisps and chips which allows the preparation of crisps and chips with traditional texture and taste while at the same time being low in fat.

To this end, the present invention provides a method for preparing crisps and chips, particularly reduced-fat crisps and chips, by washing peeled potatoes, cutting the washed potatoes to obtain slices, treating the slices with superheated steam to obtain steam-treated slices and then coating the steam-treated slices with an emulsion prepared with an edible oil and with a starchy material in aqueous dispersion or solution. Preferably, the slices are treated with the superheated steam at a temperature of from 190° C. to 270° C. and at atmospheric pressure for from 1 to 5 minutes, and the emulsion may contain the starchy material in an amount, by weight, of from 38% to 62% and is coated on the steamtreated slices in an amount of from 7–15%.

It has been observed, surprisingly, that such a method makes it effectively possible to obtain golden-coloured crisps and chips which have the taste and texture characteristics of traditional products, while at the same time having the advantage of having a relatively low fat content.

To carry out the method for preparing reduced-fat crisps and chips according to the present invention, potatoes are peeled, washed and then cut into slices. Depending on whether it is desired to prepare reduced-fat crisps or chips, the thickness of the slices may be varied from 1 to 10 mm, for example. Preferably, for the preparation of reduced-fat crisps, potatoes are cut into slices from 1 to 4 mm in thickness. Preferably, for the preparation of reduced-fat chips, potatoes are cut into slices from 5 to 10 mm in thickness.

The steam treatment step may be carried out in a band-cooker or on plates, for example.

In the course of this step, during a first phase of blanching and condensation, the superheated steam condenses on the surface of the slices. It reheats at the surface the slices which were at room temperature to a temperature level of about 100° C. This temperature is maintained as long as the water present at the surface of the slices has not completely evaporated. Next, during a second phase of drying, the slices swell and their surface temperature increases. Lastly, during a third phase, the slices undergo a deep-down drying. During this third phase, if the slices are from 1 to 4 mm in thickness, the deep-down drying is total. On the other hand, if the slices are from 5 to 10 mm in thickness, the deep-down drying is only partial.

The slices are then coated with 7–15 % of an emulsion comprising a starchy material. They may be coated in particular in a coating machine or in a coating cylinder with an emulsion containing, as a % by weight, 38–62 % starchy material, 30–60 % oil and 2–8 % salt, for example.

The said oil may be any edible oil that withstands high temperature, such as groundnut oil or olive oil, for example.

DETAILED DESCRIPTION OF THE INVENTION

The said starchy material may be an aqueous broth, dispersion or solution of starch, of tuber starch flour or of potato tuber pulp, for example. This starchy material is preferably composed of pre-hydrolysed potato scraps.

In the latter case, to prepare the emulsion, the potato scraps which have been collected during cutting of the potatoes into slices can, for example, be hydrolysed with 0.01–0.2 % alpha-amylase, in particular that marketed under the name DEXLO P by Gist-Brocades or 0.2–2 % aminoglucosidase, in particular that marketed under the name AMG 300 L by Novo, at 65–90° C. for 10–60 min.

An aromatic mixture can be sprinkled on the slices during or after the coating step, for example. They may be sprinkled in particular with an aromatic mixture containing herbs, spices, vegetable flakes and/or bits of cheese.

In a first preferred embodiment of the method, crisps are prepared. To do this, after the coating step, the slices are toasted at 155–180° C. for 1–5 min in an air-oven or with superheated steam, and are then cooled to 15–25° C. before packaging them, for example. Crisps with a crunchy texture are thus obtained.

In a second preferred embodiment of the method, chips are prepared. To do this, after the coating step, the slices are cooled to 15–25° C. and are then packaged and frozen between −25° C. and −17° C., for example. Chips with a crisp surface and a tender centre are thus obtained.

The subject of the present invention is also the reduced-fat crisps and chips obtained by the present method and whose fat content is 5–7 %.

EXAMPLES

The method of preparing reduced-fat crisps and chips according to the present invention is described in greater detail in the non-limiting examples below. In these examples, the percentages and parts are given on a weight basis, except where otherwise indicated.

Example 1

Reduced-fat chips are prepared.

To do this, potatoes are peeled, washed and cut into slices 5 mm in thickness.

The slices are treated with superheated steam at 200° C. and at atmospheric pressure for 4 min. To do this, this step is carried out in a band-cooker.

In parallel, the potato scraps which have been collected during the slicing of the potatoes are hydrolysed with 0.1 % DEXLO P alpha-amylase at 75° C. for 20 min.

An emulsion containing 45% hydrolysed potato scraps, 50% groundnut oil and 5% salt is then prepared.

The potato slices treated with superheated steam at atmospheric pressure are then coated with 9% of the emulsion thus prepared. To do this, the emulsion is sprayed onto the slices in a coating cylinder using a twin-flow nozzle.

The slices are cooled to 20° C. before being packaged and frozen at −18° C.

Reduced-fat chips which are ready for baking by the consumer, so as to finish off their cooking, are thus obtained. These chips, oven-baked at 170° C. for 5 min, are tender on the inside and crisp on the outside and have a fat content of 5%.

Example 2

Reduced-fat crisps are prepared.

To do this, the method is carried out as described in Example 1 up to the coating step.

The slices are then toasted at 170° C. for 3 min in a superheated-steam oven.

After this step, they are cooled to 20° C. and packaged in hermetically sealed sachets.

Golden, reduced-fat crisps with a crunchy texture and having a fat content of 5% are thus obtained.

Example 3

Flavoured reduced-fat crisps are prepared.

To do this, the method is carried out as described in Example 1 up to the coating step.

While still moist, an aromatic mixture containing 50% tomato flakes, 30% paprika and 20% parsley is then sprinkled onto the slices.

They are toasted at 170° C. for 3 min in a super-heated-steam oven.

After this step, they are cooled to 20° C. and packaged in hermetically sealed sachets.

Golden, herb-flavoured reduced-fat crisps with a crunchy texture and having a fat content of 5% are thus obtained.

I claim:

1. A process for preparing a potato product comprising:
   washing peeled potatoes to obtain washed potatoes;
   cutting the washed potatoes to obtain slices; and
   treating the slices with superheated steam having a temperature of from 190° C. to 270° C. at atmospheric pressure for from 1 minute to 5 minutes to obtain steam-treated slices and preparing an emulsion with an edible oil and with a starchy material in a form selected from the group consisting of an aqueous dispersion and an aqueous solution and coating the steam-treated slices with the emulsion to obtain a potato product.

2. A process according to claim 1 wherein, by weight, the emulsion comprises the starchy material in an amount of from 38% to 62% and the emulsion is coated onto the steam-treated slices in an amount of from 7% to 15%.

3. A process according to claim 2 wherein the oil is in an amount of from 30% to 60%.

4. A process according to claim 1 wherein the starchy material is selected from the group consisting of starch, tuber starch flour, potato tuber pulp and potato scraps.

5. A process according to claim 1 wherein the starchy material comprises hydrolyzed potato scraps.

6. A process according to claim 2 or 3 wherein the starchy material comprises hydrolyzed potato scraps.

7. A process according to claim 1 further comprising toasting the potato product at a temperature of from 155° C. to 180° C. to obtain a toasted potato product and then cooling the toasted potato product to a temperature of from 15° C. to 25° C. to obtain a cooled toasted potato product.

8. A process according to claim 5 further comprising toasting the potato product at a temperature of from 155° C. to 180° C. to obtain a toasted potato product and then cooling the toasted potato product to a temperature of from 15° C. to 25° C. to obtain a cooled toasted potato product.

9. A process according to claim 6 further comprising toasting the potato product at a temperature of from 155° C. to 180° C. to obtain a toasted potato product and then cooling the toasted potato product to a temperature of from 15° C. to 25° C. to obtain a cooled toasted potato product.

10. A process according to claim 9 further comprising cooling the potato product to a temperature of from 15° C. to 25° C. to obtain a cooled product, packaging the cooled product to obtain a packaged product and then freezing the packaged product at a temperature of between −25° C. and −17° C.

11. A process According to claim 1 or 2 wherein the washed potatoes are cut to obtain slices having a thickness of from 1 mm to 10 mm.

12. A process according to claim 1 or 2 wherein the washed potatoes are cut to obtain slices having a thickness of from 5 mm to 10 mm.

13. A process according to claim 5 further comprising hydrolyzing potato scraps with an enzyme selected from the group consisting of alpha-amylase and aminoglucosidase to obtain the hydrolyzed potato scraps and wherein when the enzyme is alpha-amylase, the enzyme is in an amount of from 0.01% to 0.2% by weight and wherein when the enzyme is aminoglucosidase, the enzyme is in an amount of from 0.2% to 2%.

14. A process according to claim 13 wherein the potato scraps are hydrolyzed at a temperature of from 65° C. to 90° C. for from 10 minutes to 60 minutes.

15. A process according to claim 1 wherein the oil is selected from the group consisting of ground nut oil and olive oil.

16. A process according to claim 1 further comprising sprinkling the slices with an aromatic mixture which comprises members selected from the group consisting of herbs, spices, vegetable flakes and cheese.

17. A process according to claim 3 wherein the emulsion further comprises 2% to 8% salt.

* * * * *

UNITED STATES PATENT AND TRADEMARK OFFICE
CERTIFICATE OF CORRECTION

PATENT NO. : 5,891,494
DATED : April 6, 1999
INVENTOR(S) : Ernest Badertscher

It is certified that error appears in the above-indentified patent and that said Letters Patent is hereby corrected as shown below:

Claim 10, line 1 (col. 4, ~ adjacent marginal line number 28), delete "9" and insert therefor -- 1 --.

Signed and Sealed this

Thirty-first Day of August, 1999

Attest:

Q. TODD DICKINSON

*Attesting Officer*  *Acting Commissioner of Patents and Trademarks*